2,797,576

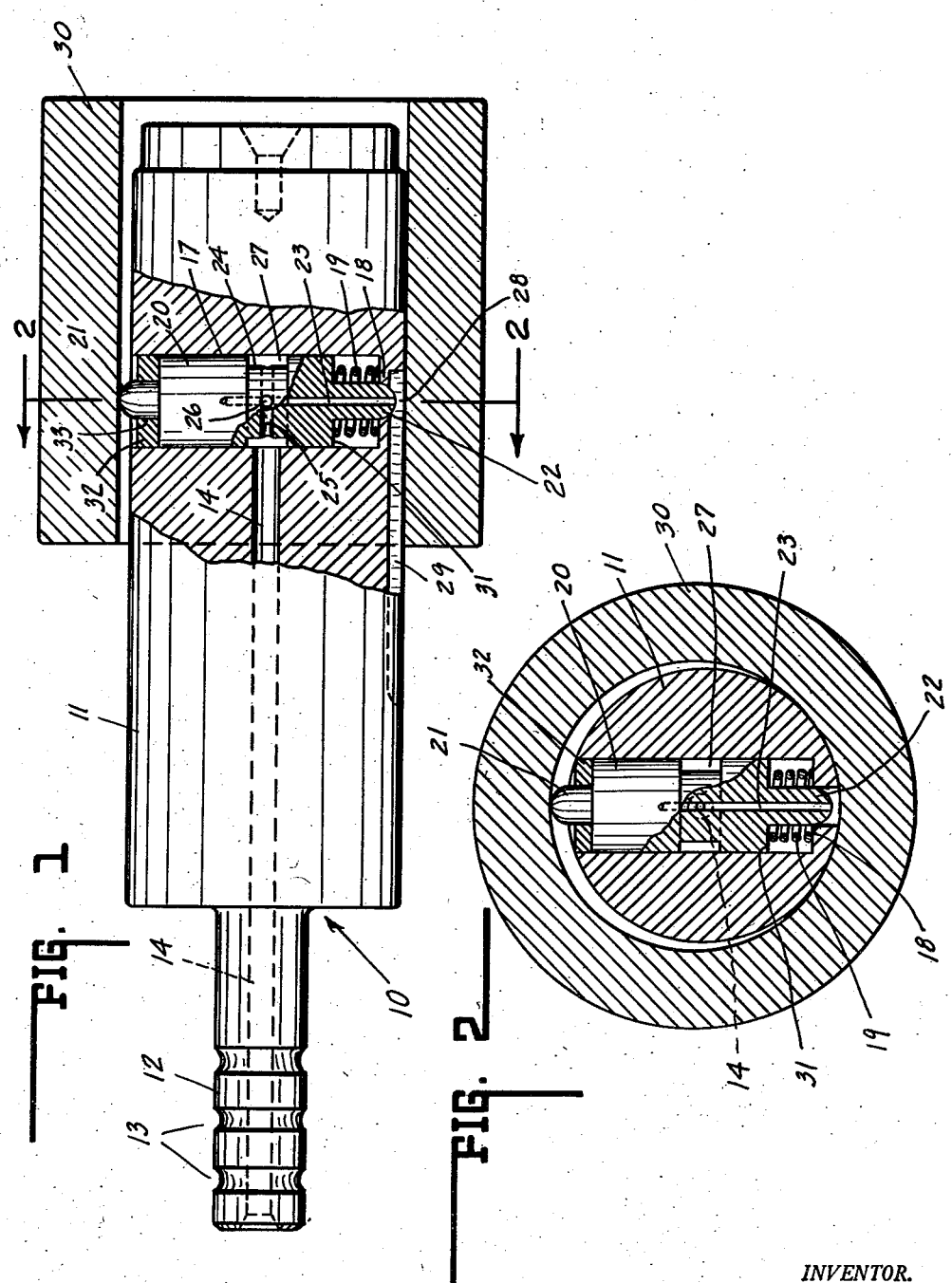

AIR GAUGE SPINDLE

Malcolm P. Haines, Indianapolis, Ind., assignor to Merz Engineering, Inc., Indianapolis, Ind., a corporation Application November 23, 1953, Serial No. 393,599

6 Claims. (Cl. 73—37.9)

This invention relates to an air gauge spindle, and more particularly to one of the balanced orifice type.

In the use and application of the gauge covered by my Patent No. 2,622,331, issued December 23, 1952, and entitled Snap Gauge, it has been found that by reason of the employment of two separate radially movable valve stems there is a greater chance of error than where one such member is provided. Still further, it has been determined that the cost and expense of construction of my earlier gauge is greater than where a single piston or cylinder is provided. It is, therefore, the primary object of this invention to provide an improved gauge over that disclosed in said patent for measuring the inside diameter of circular bores.

It is a further object of the present invention to provide a gauge that will bring about a more accurate reading.

It is a still further object of the present invention to provide a gauge of the character described which will have a minimum number of parts, be easier to construct and, therefore, less expensive than conventional gauges now in use.

It is a still further object of the present invention to provide a gauge which will combine the advantages of the two types of conventional gauges, namely the jet type and the contact type.

It is a still further object of the present invention to provide a gauge which is characterized by perfect balance, that is to say wherein the fluid escapement gap remains the same distance from the wall of the bore being measured even though the gauge may be deflected from absolute alignment within the bore.

It is a still further object of the present invention to provide a gauge of such character that a longer dimensional range check is possible.

The full nature of the invention will be understood from the accompanying drawings and the following description and claims.

In the drawings:

Fig. 1 is a side elevation view of the invention inserted within the bore of the structure to be measured, with portions of the invention broken away, and in section.

Fig. 2 is a transverse section view of the invention taken on lines 2—2 of Fig. 1 in the direction of the arrows.

In the drawings the gauge or spindle is shown generally at 10, it comprising the spindle body 11 of circular conformation and the stem 12 extending outwardly therefrom. A plurality of spaced annular grooves 13 are provided so that the air hose or the like (not shown) that is slipped over the stem may better be retained in position. Extending axially of the stem and spindle body is the air or fluid passage 14.

Formed diametrically or transversely through the body of the spindle and at right angles to the axial passage is the bore 17. The bore is narrowed or reduced at one end to form the annular shoulder 18 which serves as a bearing for one extremity of the spring 19. Slidably mounted within the bore is the floating member or cylinder 20. This cylinder, as will be observed, is of spool type, is not keyed in any manner to the walls defining the bore and is, therefore, free to turn about its axis as well as the slide to and fro within the bore as hereinafter described. The opposite ends of the cylinder are provided with round headed pins or fingers 21 and 22, the latter finger being longer than the former and having a passage 23 formed therethrough. The length of the cylinder or sliding valve body must be slightly shorter than the inside diameter of the ring 30 being measured. That is to say, the distance from the tip of finger 21 to the tip of finger 22 must be slightly less than the inside diameter of the ring as will hereinafter appear.

The center portion of the cylinder is annularly cut away to form the reduced periphery 24. Extending through the reduced periphery from surface to surface thereof are the intersecting, radial passages 25 and 26 each having communication with the passage 23.

As will be observed from the figures the annularly reduced portion 24 is so located as to confront and be in alignment with the axial passage 14 of the spindle body. Thus as air enters the passage 14 it will be introduced into the annular chamber 27 lying between the wall of the bore and the peripheral face of the reduced portion 24. From thence the air will enter the passages 25 and 26 and will escape through the orifice 28 at the mouth of the passage 23. This escape is facilitated by provision of the groove 29.

In operation the invention will be disposed within a ring or structure 30, the inside diameter of which is to be measured. It is understood, of course, that the invention will be suitably connected with a gauging apparatus wherein the passage of fluid under pressure is controlled by the gauge member, the passage of the fluid being operable to control a suitable dimension indicator. Once the spindle is satisfactorily located within the ring bore the diameter of the bore can be measured accurately. The orifice 28 will always be retained the same distance from the bore wall in any given inside diameter of the ring. This is true for the reason that spring 19 always keeps finger 21 in contact with the inner wall of the ring, and if the spindle body is unintentionally located out of true alignment, that is to say, deflected from absolute alignment within the bore, the cylinder and the orifice will nonetheless be the same distance from the bore wall as if the spindle body were in true alignment therewithin.

For example, as shown in Fig. 2, the spindle body is not in true axial alignment within the bore. The spring 19, one end of which bears, as aforesaid, upon the shoulder 18, and the other end of which bears upon the shoulder 31 has urged the cylinder to its furtherest limit in the direction of the spring constraint. The retainer 32 which is press fitted within the bore defines this limit. It is provided with a central opening 33 which passes the finger or pin 21 to the extent shown in Fig. 1 but serves as a stop for further movement in that direction by the cylinder. In the event the spindle body is moved in the direction that is illustrated as being upwardly in the drawings, the rounded head of the finger which is in engagement with the wall of the bore will be forced downwardly, i. e. inwardly, carrying with it the cylinder with which it is integral. This movement will be against the bias or constraint of the spring and will force the opposite finger or pin 22 outwardly. As heretofore stated, since the length of the cylinder is slightly less than the inside diameter of the ring, air will always be able to escape through the orifice 28.

Thus regardless of in what position the spindle body is located within the bore of the structure to be measured, the orifice of air escapement will always be the same distance from the bore wall. With this construction and arrangement accuracy of dimensional measurement is always assured with a minimum possibility of parts failure.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An air gauge spindle for a bore measuring device comprising a body having an axial passage and a bore extending radially from said passage through said body and defining openings on opposite faces of said body, a member slidably mounted in said radially extending bore and having end portions, said member being biased so that one of said end portions normally extends beyond its adjacent opening for yielding engagement with the wall defining the bore to be measured, means mounted within said radially extending bore for biasing said member, said member having a passage opening through the other end portion and communicating with said first mentioned passage and the circumambient atmosphere.

2. An air gauge spindle for a bore measuring device comprising a body having an axial passage and a bore extending radially from said passage through said body and defining openings on opposite faces of said body, a member slidably mounted in said radially extending bore and having end portions, said member being biased so that one of said end portions normally extends beyond its adjacent opening for yielding engagement with the wall defining the bore to be measured, means mounted within said radially extending bore for biasing said member, stop means limiting the movement of said member, said member having a passage opening through the other end portion and communicating with said first mentioned passage and the circumambient atmosphere.

3. An air gauge spindle for a bore measuring device comprising a body having an axial passage and a bore extending radially from said passage through said body and defining openings on opposite faces of said body, a member slidably mounted in said radially extending bore and having end portions, said member being biased so that one of said end portions normally extends beyond its adjacent opening for yielding engagement with the wall defining bore to be measured, means mounted within said radially extending bore for biasing said member in one direction, a passage extending through the other of said end portions and communicating with the circumambient atmosphere, said member being annularly reduced intermediate its end portions to form a chamber between it and the wall of said radially extending bore, said chamber communicating with said first mentioned passage, and a plurality of radial passages formed in said annularly reduced portion of said member and communicating with said chamber and said second passage.

4. An air gauge spindle for a bore measuring device comprising a body having an axial passage and a bore extending radially from said passage through said body and defining openings on opposite faces of said body, said radially extending bore being reduced in diameter adjacent one end to form an annular shoulder, a member slidably mounted in said radially extending bore and having end portions, said member being biased so that one of said end portions normally extends beyond its adjacent opening for yielding engagement with the wall defining the bore to be measured, spring means mounted within said radially extending bore for biasing said member in one direction, one end of said resilient means bearing upon said shoulder with its other end bearing upon said member, said member having a passage extending through the other of said end portions and communicating with the circumambient atmosphere, and a plurality of radial passages formed in said member and intersecting said second mentioned passage, said intersecting passages being in communication with said first mentioned passage.

5. An air gauge spindle for a bore measuring device comprising a body having an axial passage and a bore extending radially from said passage through said body and defining openings on opposite faces of said body, a cylindrical member slidably and rotatably mounted in said radially extending bore and having end portions, said member being biased so that one of said end portions normally extends beyond its adjacent opening for yielding engagement with the wall defining the bore to be measured, said member being annularly reduced intermediate its end portions to form a chamber between the peripheral wall of said reduced portion and the wall of said radially extending bore, said chamber being in communication with said passage, a second passage formed through the other end portion of said member and communicating with the circumambient atmosphere, spring means mounted within said radially extending bore for biasing said member in one direction, and a plurality of radial passages formed in the reduced portion of said member, said passages communicating with said second mentioned passage and with said chamber.

6. An air gauge spindle for a bore measuring device comprising a body having an axial passage and a bore extending radially from said passage through said body and defining openings on opposite faces of said body, a cylindrical member slidably and rotatably mounted in said radially extending bore and having end portions, said member being biased so that one of said end portions normally extends beyond its adjacent opening for yielding engagement with the wall defining the bore to be measured, said member being annularly reduced intermediate its end portions to form a chamber between the peripheral wall of said reduced portion and the wall of said radially extending bore, said chamber being in communication with said passage, a second passage formed through one end portion of said member and communicating with the circumambient atmosphere, spring means mounted within said radially extending bore and biasing said member in one direction, a plurality of passages communicating with said second passage and extending radially from said second passage through the wall of said reduced portion and communicating with said chamber, and a groove formed longitudinally in the peripheral wall of said spindle, said groove intersecting with said second mentioned passage.

References Cited in the file of this patent

UNITED STATES PATENTS

| | | |
|---|---|---|
| 2,622,331 | Haines | Dec. 23, 1952 |
| 2,636,380 | Van Dorn | Apr. 28, 1953 |
| 2,680,912 | Wylie | June 15, 1954 |

FOREIGN PATENTS

| | | |
|---|---|---|
| 341,365 | Great Britain | Jan. 15, 1931 |
| 875,738 | France | Oct. 1, 1942 |